US008570559B2

(12) United States Patent  
Koh et al.

(10) Patent No.: US 8,570,559 B2  
(45) Date of Patent: Oct. 29, 2013

(54) PRINTING SYSTEM AND METHOD FOR ANALYZING DOCUMENT PROPERTIES, CALCULATING METRICS, AND SELECTING INK SET

(75) Inventors: Kok-Wei Koh, Mountain View, CA (US); Ehud Chatow, Palo Alto, CA (US); Gary J. Dispoto, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 892 days.

(21) Appl. No.: 12/546,224

(22) Filed: Aug. 24, 2009

(65) Prior Publication Data

US 2011/0043849 A1 Feb. 24, 2011

(51) Int. Cl.
*G06F 3/12* (2006.01)
*H04N 1/60* (2006.01)
*H04N 1/46* (2006.01)
*B41J 2/01* (2006.01)
*B41J 2/195* (2006.01)

(52) U.S. Cl.
USPC ........... 358/1.15; 358/1.9; 358/502; 358/504; 347/1; 347/7; 347/14; 347/100

(58) Field of Classification Search
USPC ......... 358/1.15, 1.9, 78, 522, 518, 1.16, 1.17, 358/1.18, 406, 426.05, 426.06, 448, 441, 358/447, 461, 501, 529, 519, 503; 383/286, 383/162, 167, 168; 347/1, 7, 5, 9, 16, 19, 347/43, 100, 225, 104, 105, 86, 95, 110, 347/197, 214

See application file for complete search history.

(56) References Cited

U.S. PATENT DOCUMENTS

| | | | |
|---|---|---|---|
| 5,710,824 A * | 1/1998 | Mongeon | 382/162 |
| 5,833,743 A | 11/1998 | Elwakil | |
| 6,290,762 B1 | 9/2001 | Elwakil | |
| 6,291,829 B1 * | 9/2001 | Allen et al. | 250/559.07 |
| 7,123,380 B2 | 10/2006 | Van de Capelle | |
| 7,420,704 B2 | 9/2008 | Simpson et al. | |
| 7,595,910 B2 | 9/2009 | Mahy et al. | |
| 2004/0109178 A1 * | 6/2004 | Couwenhoven et al. | 358/1.9 |
| 2006/0170939 A1 | 8/2006 | Misumi | |
| 2007/0086026 A1 | 4/2007 | Huang et al. | |
| 2008/0043263 A1 | 2/2008 | Hancock | |
| 2008/0266584 A1 | 10/2008 | Beckman et al. | |
| 2009/0303502 A1 * | 12/2009 | Robinson et al. | 358/1.9 |
| 2011/0013206 A1 | 1/2011 | Mestha et al. | |

OTHER PUBLICATIONS

International Search Report dated Sep. 22, 2011, issued on PCT/US2011/023454 filed on Feb. 2, 2011.

* cited by examiner

*Primary Examiner* — Ngon Nguyen

(57) ABSTRACT

A printing system and method include analyzing a plurality of properties of a document, and for each of a plurality of ink sets, calculating a metric for each of the properties.

19 Claims, 2 Drawing Sheets

PRINTING SYSTEM AND METHOD FOR ANALYZING DOCUMENT PROPERTIES, CALCULATING METRICS, AND SELECTING INK SET

BACKGROUND

Color printers typically use ink sets having three or four color inks. For example, a common ink set includes three ink colors: cyan, magenta and yellow (CMY). Other ink sets add black ink to the basic CMY system, resulting in a CMYK system. Such three and four ink sets produce some colors by overprinting two of the color inks on top of one another. The gamut of overprinting colors available to a given printer is restricted by the properties of the color inks and may not meet the demands of some printing situations.

Other printers, such as higher end printers and digital presses use ink sets having additional ink colors to increase the available color gamut. For example, Pantone's HEXACHROME (CMYKOG) and Hewlett-Packard's INDICHROME (CMYKOV) ink sets offer a wider color gamut than traditional CMYK inks. The addition of Pantone spot colors to an ink set allows printing of specialized logos, for instance, without the need for half toning. Adding light cyan and light magenta to a basic CMYK ink set (CMYKcm) can reduce the appearance of grain in printed images. Even gray scale images can benefit from the use of modified ink sets, such as an ink set consisting of black along with one or more levels of gray.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

In the following disclosure, specific details may be set forth in order to provide a thorough understanding of the disclosed systems and methods. It should be understood however, that all of these specific details may not be required in every implementation. In other instances, well-known methods, procedures, components, circuits, and networks have not been described in detail so as not to unnecessarily obscure the disclosed systems and methods.

It will also be understood that, although the terms first, second, etc. are used herein to describe various elements, these elements should not be limited by these terms. These terms are only used to distinguish one element from another.

Figure 1:
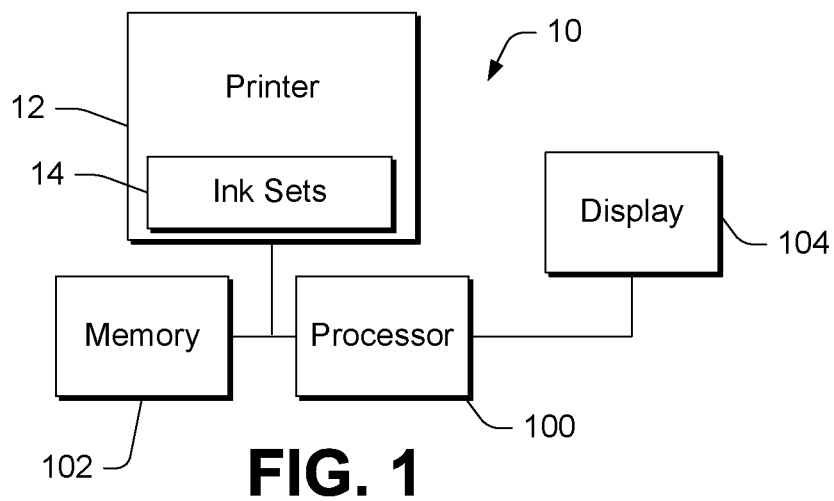
FIG. 1 is a block diagram conceptually illustrating an embodiment of a printing system.

FIG. 1 conceptually illustrates portions of an embodiment of a printer system 10, which includes a printing device 12, such as a color ink printer or digital press. A plurality of ink sets 14 are available to the printer. For instance, the ink sets 14 could include CMYK, CMYKcm and CMYKOV ink sets. Certain ink sets are more suitable for printing some documents than others, depending on a user's desires. For example, an ink set with more colors may improve image quality, but the additional inks also may reduce the production speed and increase cost. The ink sets 14 are not limited to assortments of different colored inks, but may also include multiple impressions or separations of a single ink color. For instance, some printers or presses allow for a single ink in an ink set to be cycled multiple times. Thus, a CMYK ink set could cycle the black ink twice, effectively resulting in a CMYKK ink set.

A processor 100 is configured to analyze properties of a document to be printed, and in response to this analysis one of the available ink sets 14 is recommended or selected for printing the document. In general, the processor 100 may be integral to the printer 12 or a component of an external system connected to the printer 12 via a network, for example. It may be implemented in any one of a wide variety of electronic devices, including laptop, desktop and workstation computers.

In some implementations, process instructions (machine-readable code, such as computer software) for implementing the methods that are executed by embodiments of the printing system 10 are stored in one or more machine-readable media 102. Storage devices suitable for tangibly embodying these instructions and data include all forms of computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

Figure 2:
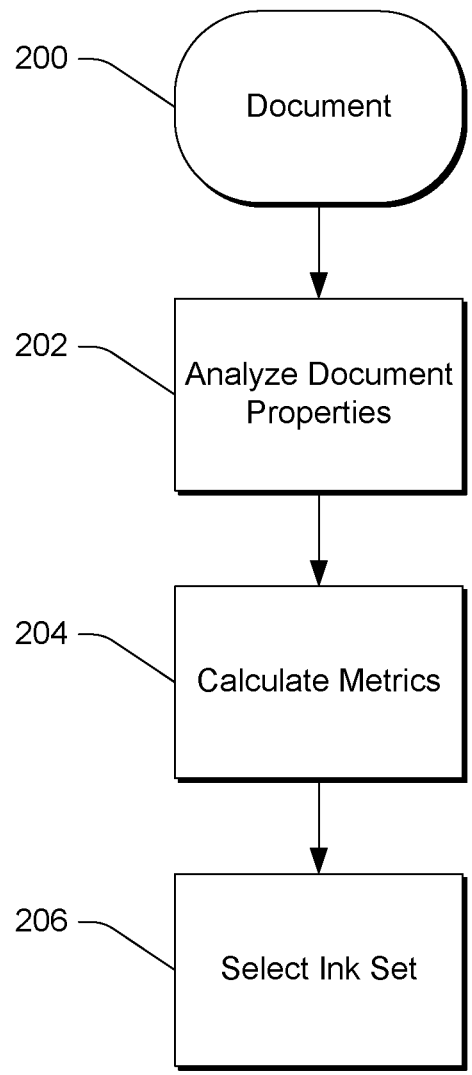
FIG. 2 is a flow diagram illustrating portions of an embodiment of a printing method.

FIG. 2 generally illustrates portions of a method in accordance with disclosed embodiments. The system 10 receives as an input a document file 200, such as a pdf or postscript file. Properties of the document are analyzed in block 202, and for each of the ink sets 14, a metric is calculated for applicable properties of the document in block 204. In block 206, at least one of the ink sets 14 is selected based on the metrics. In some embodiments, the document file 200 includes multiple images, which can each be individually analyzed and the appropriate ink sets 14 are recommended or selected for each of the images in the document 200.

Referring back to FIG. 1, some embodiments include a display device 104, such as a computer monitor or a printed report that provides a report for review by a user. For example, one or more of the sets 14 can be recommended, the available ink sets can be given scores and ranked, etc., and the user can then select the desired ink set based on the data provided. Or, after considering the information provided on the display 104, the user can modify the user preferences and repeat the process. In other implementations, the process is completely automated, where the system 10 simply prints the document using the ink set 14 selected in block 206.

In further embodiments, more than one printer 12 is included in the system 10, with the various printers including different ink sets 14. Thus, in some instances, the document 200 could be printed using more than one printer 12. For example, each page of the document can be individually analyzed with metrics calculated for each image. The best ink set 14 is selected for the respective image based on the calculated metrics, and the images of the document 200 are printed on the respective printer 12 that includes the selected ink set 14. The printed pages can be collated at the respective printers 12 then assembled into a final document at a finishing station.

Figure 3:
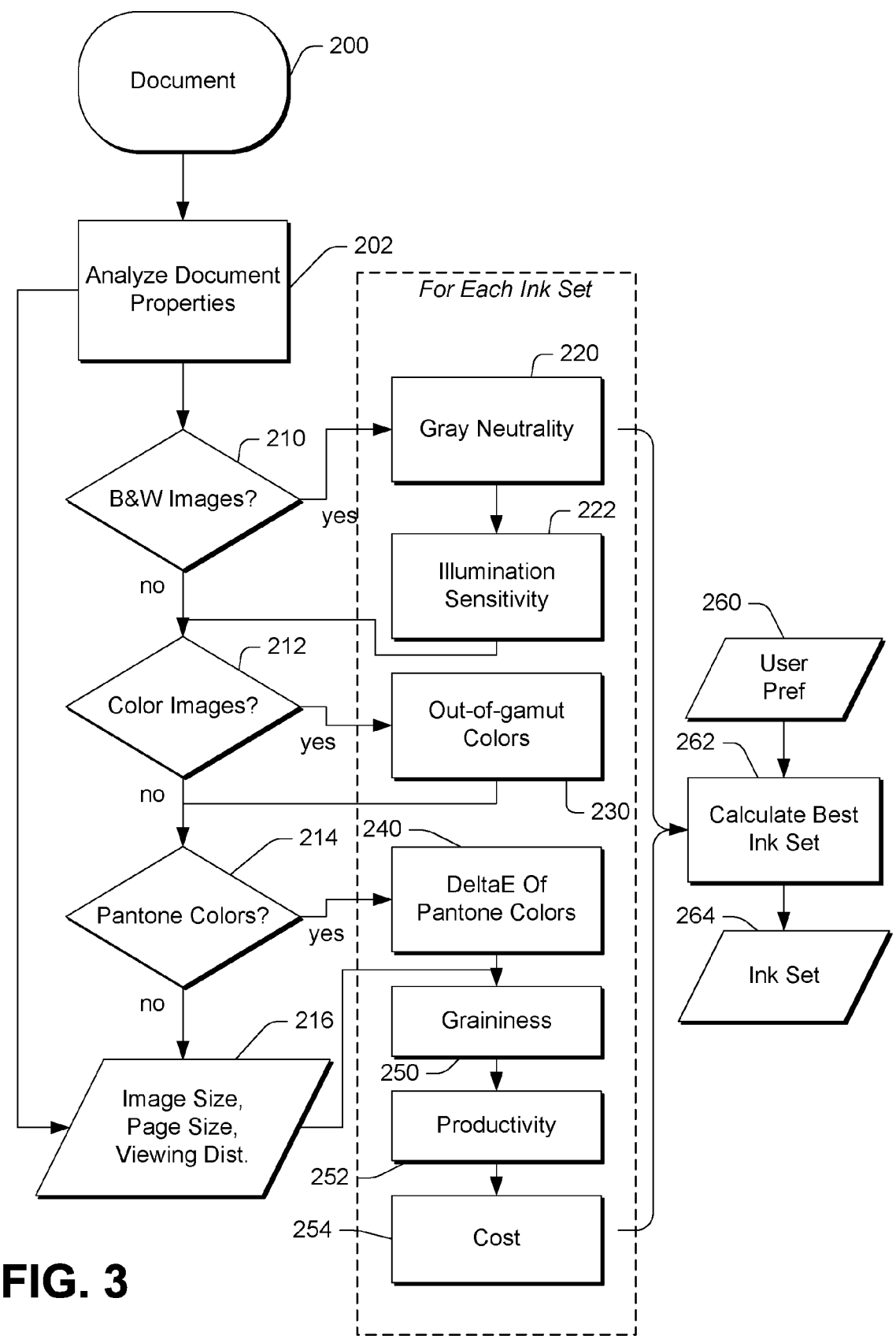
FIG. 3 is a flow diagram illustrating further aspects of an embodiment of a printing method.

FIG. 3 illustrates aspects of a method in accordance with one embodiment. The document file 200 is input and analyzed in block 202. The analysis results in determining various document properties, such as image size, page size, viewing distance, etc. in block 216. They analysis in block 202 further determines whether the document includes black and white images, color images and Pantone colors in blocks 210, 212 and 214, respectively. For each of the ink sets, various metrics are calculated based on the document properties. Further embodiments are envisioned where additional or different properties are analyzed, such as regional color space standards.

If the document includes black and white images as determined in block 210, metrics related to black and white images are calculated, such as gray neutrality in block 220 and illumination sensitivity in block 222. If the system determines in block 212 that the document 200 includes color images, the percent of out of gamut colors is calculated in block 230 for each ink set 14. In block 214, the system determines whether Pantone colors are included in the document 200. If Pantone colors are present, the deltaE of the Pantone colors is calculated for each ink set 14. Additional metrics are calculated based on the document properties, such as graininess, productivity and cost in blocks 250, 252 and 254, respectively.

The metrics calculated for each ink set are analyzed in block 262, along with user input 260 to select or recommend an ink set 264, which can then be used to print the document 200. In general, using an ink set with more inks improves image quality. However, the additional inks also can reduce productivity and increase costs. Based on a user's weighting of these parameters, the system can recommend or select an optimal ink set for the document under consideration. In some embodiments, a summary of the calculated metrics and associated weight factors is provided for the given document.

Consider an example where the system includes three ink sets:
CMYK
CMYKcm
CMYKOV In this example, the document 200 is a high quality color image, so any black/gray ink sets are not considered. The document properties are analyzed in block 202 and it is determined that the document size is 6×9 inches, the page size is 8.5×11 inches, and the viewing distance is 16 inches. Since the document is a color image, the decision block 210 will return no black and white images. Block 212 will determine the presence of the color image, so the percent of out-of-gamut colors will be determined in block 230 for each available ink set 14.

In one embodiment, the percent out-of-gamut metric is determined by calculating the percentage of pixels in an image that have a DeltaE94 value that exceeds a given threshold (for example, a threshold of 3) when it is converted to the output ICC profile of a given ink set. In the example under consideration, the percent of out-of-gamut colors for each ink set are calculated as 10%, 10% and 2% for the CMYK, CMYKcm and CMYKOV ink sets, respectively. In other words, the CMYKOV ink set would print the document 200 with fewer out-of-gamut colors than the other ink sets. Graininess, productivity and cost are calculated in blocks 250, 252 and 254 for each of the ink sets as follows

|  | CMYK | CMYKcm | CMYKOV |
|---|---|---|---|
| Graininess | 5.0 | 2.0 | 4.5 |
| Productivity | 1.1 | 0.74 | 0.74 |
| Cost | 4.0 | 6.0 | 6.0 |

The CMYK ink set users fewer inks so it prints faster and costs less. The CMYKcm ink set has the lowest value for graininess.

The following user preferences, or weight factors are provided from block 260.

| | |
|---|---|
| Gray Neutrality | NA |
| Illumination Sensitivity | NA |
| Percent out-of-gamut: | 6 |
| Pantone | NA |
| Graininess: | 10 |
| Print Speed | 2 |
| Cost | 3 |

Thus, for the particular user, the graininess and out-of-gamut metrics are more important than productivity and cost.

The user preferences along with the calculated color image metrics are input to block 262, resulting in the CMYKcm ink set being selected or recommended in block 264.

In another example, the document 200 is a grayscale image, and three ink sets are available:
CMYK
K+gray
CMYKcm The analysis in block 202 determines that the document size is 6×9 inches, the page size is 8.5×11 inches, and the viewing distance is 16 inches. Block 210 determines the presence of the black and white image, so gray neutrality and illumination sensitivity are calculated in blocks 220 and 222 for each of the ink sets 14. An example algorithm for the gray neutrality metric determined in block 220 is to calculate the average DeltaE94 for each pixel in the image from the neutral axis when it has been processed by the output ICC profile of a given ink set. An example algorithm for the illumination sensitivity metric determined in block 222 is to calculate the average DeltaE94 for all the pixels in an image when illuminated under one illuminant (daylight D50) compared to another illuminant (cool white fluorescent) for a given ink set. In this particular example, the gray neutrality is 0.75, 0.25, and 0.85 for the CMYK, K+gray and CMYKcm ink sets, respectively. The illumination sensitivity is 6.0, 1.1 and 5.4 for CMYK, K+gray and CMYKcm ink sets, respectively.

Graininess, productivity and cost are calculated in blocks 250, 252 and 254 for each of the ink sets as follows

|  | CMYK | K + gray | CMYKcm |
|---|---|---|---|
| Graininess | 5.0 | 1.5 | 2.5 |
| Productivity | 1.1 | 2.2 | 0.74 |
| Cost | 4.0 | 2.0 | 6.0 |

The following user preferences, or weight factors are provided from block 260.

| | |
|---|---|
| Gray Neutrality: | 8 |
| Illumination Sensitivity | 8 |
| Percent out-of-gamut: | NA |
| Pantone | NA |
| Graininess: | 7 |
| Print Speed | 5 |
| Cost | 6 |

Based on the calculated metrics and user input, the K+gray ink set is output in block 264.

Thus, the disclosed system and method determine an optimal ink set for a given print job. Calculating and providing quantifiable measures for available ink sets can allow users to take advantage of multiple ink sets and specialty inks. In some embodiments, all of the metrics or predetermined metrics are provided for the user's review on the display device 104. Based on the displayed metrics, the user can select the desired ink set(s), or adjust the user preferences and repeat the analysis.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A printing system, comprising:
a printer;
a plurality of ink sets available to the printer; and
a processor configured to analyze a plurality of properties of a document, and for each of the ink sets, calculate respective metrics for each of the properties, and in response to the metrics and user preference, select one of the ink sets.

2. The printing system of claim 1, wherein the processor is configured to rank the ink sets in response to the metrics.

3. The printing system of claim 1, wherein the printer is configured to print the document using the selected ink set.

4. The printing system of claim 1, wherein the printer and the processor are connected by a network.

5. The printing system of claim 1, further comprising a memory accessible by the processor, the memory storing weight factors for the plurality of properties, wherein the processor is configured to select one of the ink sets further in response to the weight factors.

6. The printing system of claim 1, wherein the processor is configured to select first and second ones of the ink sets in response to the metrics; and wherein the printing system further comprises first and second printers configured to print the document using the first and second selected ink sets, respectively.

7. The printing system of claim 1, further comprising a display device configured to display the calculated metrics.

8. A printing method, comprising:
analyzing a plurality of properties of a document;
for each of a plurality of ink sets available to a printer, calculating respective metrics for each of the properties; and
selecting one of the ink sets in response to the metrics and user preference.

9. The method of claim 8, further comprising ranking the ink sets in response to the metrics.

10. The method of claim 8, further comprising:
printing the document using the selected ink set.

11. The method of claim 8, further comprising:
assigning respective weight factors to each of the properties; and
selecting one of the ink sets further in response to the weight factors.

12. The method of claim 8, wherein the properties include gray neutrality.

13. The method of claim 8, wherein the properties include illumination sensitivity.

14. The method of claim 8, wherein the properties include out-of-gamut colors.

15. The method of claim 8, wherein the properties include pantone colors.

16. The method of claim 8, wherein the properties include productivity.

17. The method of claim 8, wherein the properties include cost.

18. A non-transitory computer readable medium storing process instructions that when executed perform a printing method comprising:
analyzing a plurality of properties of a document; and
for each of a plurality of ink sets available to a printer, calculating respective metrics for each of the properties;
selecting one of the ink sets in response to the metrics and user preference; and
printing the document by the printer using the selected ink set.

19. The non-transitory computer readable medium of claim 18, wherein the non-transitory computer readable medium stores respective weight factors for each of the properties, and wherein the method further comprises:
selecting one of the ink sets further in response to the weight factors.

* * * * *